Dec. 7, 1954          A. M. MADLÉ          2,696,567
ROTOR FOR MAGNETOS AND METHOD OF MAKING THE SAME
Filed June 7, 1951                           3 Sheets-Sheet 1

Inventor
Alain M. Madlé, DECEASED
Dorothy H. Madlé, ADMINISTRATRIX
By Ira Milton Jones
Attorney Dec. 7, 1954   A. M. MADLÉ   2,696,567
ROTOR FOR MAGNETOS AND METHOD OF MAKING THE SAME
Filed June 7, 1951   3 Sheets-Sheet 2

Inventor
Alain M. Madlé, Deceased
Dorothy H. Madlé, Administratrix
By
Attorney

Dec. 7, 1954  A. M. MADLÉ  2,696,567
ROTOR FOR MAGNETOS AND METHOD OF MAKING THE SAME
Filed June 7, 1951  3 Sheets-Sheet 3
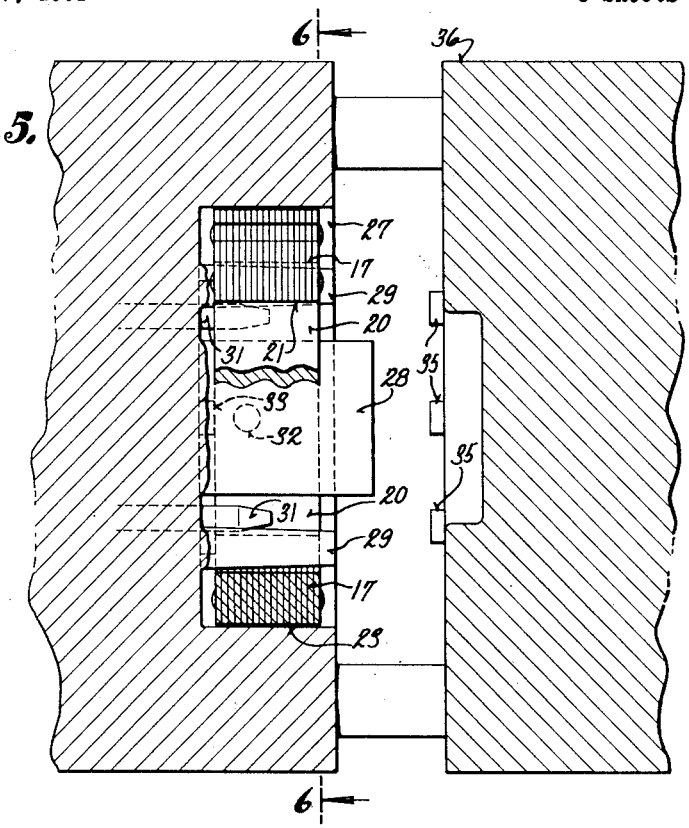
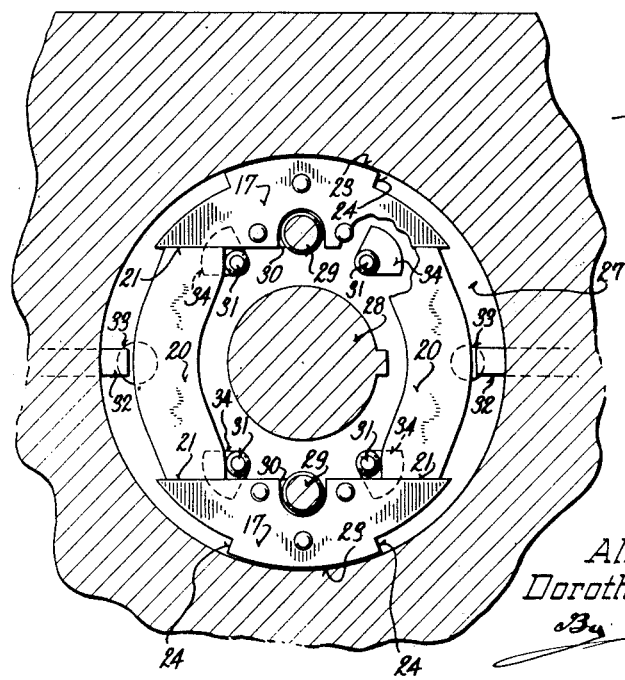
Inventor
Alain M. Madlé, Deceased
Dorothy H. Madlé, Administratrix
By
Attorney United States Patent Office 2,696,567
Patented Dec. 7, 1954

2,696,567

ROTOR FOR MAGNETOS AND METHOD OF MAKING THE SAME

Alain M. Madlé, deceased, late of Milwaukee, Wis., by Dorothy H. Madlé, administratrix, Milwaukee, Wis., assignor to Briggs & Stratton Corporation, Milwaukee, Wis., a corporation of Delaware Application June 7, 1951, Serial No. 230,295

6 Claims. (Cl. 310—42)

This invention relates to high tension magnetos and more particularly concerns the construction and method of making the rotor of the bi-pole magneto disclosed in the copending application of Alain M. Madlé, deceased, Serial No. 108,293, filed August 3, 1949, as a continuation-in-part of the application, Serial No. 653,493, filed March 11, 1946, both said applications now abandoned.

The bi-pole magneto of which the rotor of this invention is a part is of the type wherein the rotor carries the permanent magnet and the stator has a coil core connecting its two poles and upon which the primary and secondary windings are arranged in inductive relationship.

The primary purpose of this invention is to improve the construction of magneto rotors especially with a view toward facilitating the manufacture thereof.

More specifically it is an object of this invention to provide a rotor for a bi-pole magneto having a magnet system wholly embedded in a die cast body.

Another object of this invention is to provide a simple method for making a rotor of this type and which method is characterized by the utilization of the magnetic attraction of the parts comprising the magnet assembly to maintain the same assembled prior to being embedded in the non-magnetic body of the rotor.

With the above and other objects in view, which will appear as the description proceeds, this invention resides in the novel method and structure hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

Figure 5 is a longitudinal sectional view through a mold cavity showing the magnet assembly in position therein; and Figure 6 is a cross sectional view taken through Figure 5 on the plane of the line 6—6.

Figure 1:
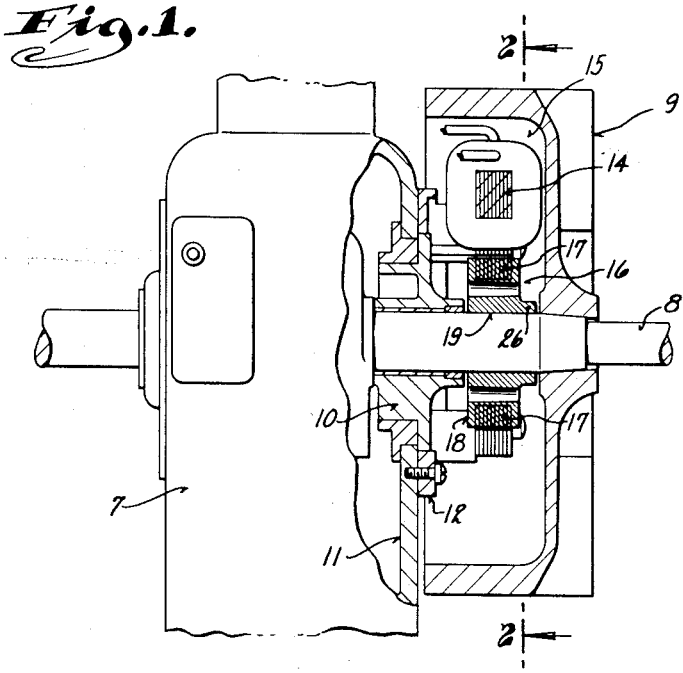
Figure 1 is a side view of a portion of a single cylinder internal combustion engine equipped with a magneto embodying the rotor of this invention, portions of the engine being shown in elevation and other portions thereof being broken away and shown in section.
Figure 2:
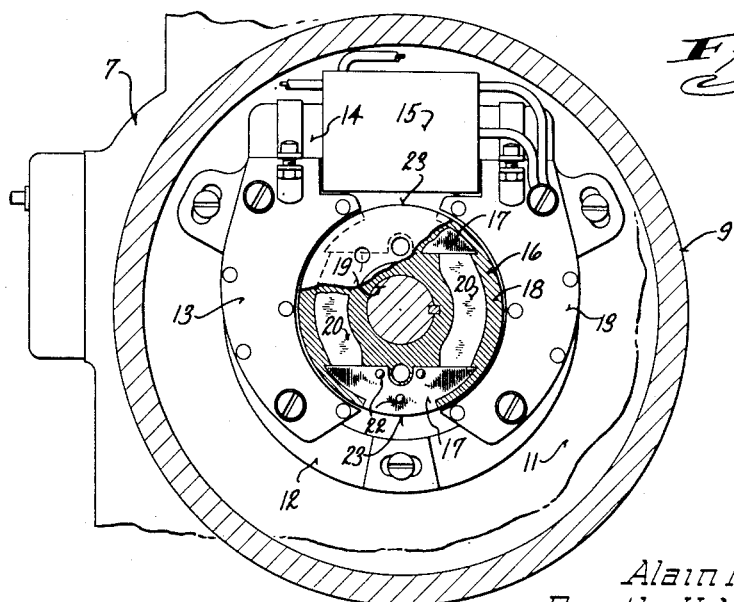
Figure 2 is a cross sectional view through Figure 1 on the plane of the line 2—2.
Figure 3:
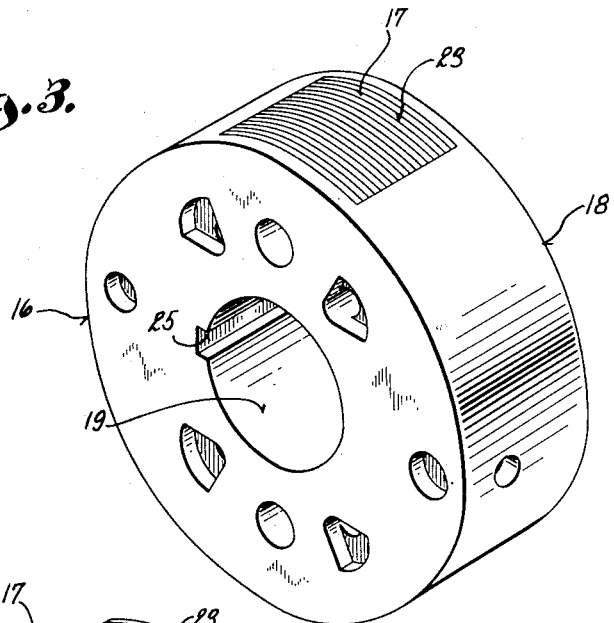
Figure 3 is a perspective view of the rotor per se.

Referring now particularly to the accompanying drawings in which like numerals indicate like parts, the numeral 7 designates the crankcase of a single cylinder internal combustion engine having a crankshaft 8 upon which a flywheel 9 is mounted. One of the crankshaft bearings is carried by a plate 10 fixed to the adjacent end wall 11 of the crankcase over an opening therein, and encircling this plate and likewise secured to the end wall 11 of the crankcase is a ring 12 upon which the stator of the magneto is mounted so that the magneto parts are neatly housed within the hollow of the flywheel 9.

The stator, as more fully defined in the aforesaid copending application, includes a pair of diametrically opposite poles 13 connected by a coil core 14 upon which the primary and secondary windings 15 of the magneto are mounted.

Fixed upon the crankshaft 8 to revolve between the arcuate faces of the poles 13 is the rotor 16 of the magneto. The rotor 16, like the stator, has two diametrically opposite magnetic poles 17 which coact with the stator poles and the operation of a pair of breaker contacts (not shown) connected in series-circuit with the primary winding, to produce the desired sparking voltage in the secondary winding each time the breaker contacts are separated.

The rotor 16 consists essentially of an annular body 18 of non-magnetic material, preferably a suitable die casting metal, having a bore 19 to fit the shaft upon which the rotor is to be mounted. Within the body 18 is embedded a magnet system comprising the poles 17 and two magnet bars 20. These bars are preferably formed of Alnico and are slightly arcuate as shown and have their opposite ends machined perfectly flat and parallel with one another to have flat abutting engagement with the undersurfaces 21 of the poles 17.

The poles 17 are preferably laminated and held together by rivets 22, and have their outermost surfaces 23 cylindrical and flush with the cylindrical periphery of the body 18 to provide the faces of the poles. It is to be observed that these outer surfaces 23 are diametrically opposite one another and of the same arcuate length. The shoulders or outer end portions of the poles are cut down or stepped as at 24 so as to lie below the cylindrical surface of the body 18 and thus securely anchor the poles in the body.

The body casting has greater axial length than the thickness of the banks of laminae which provide the poles and the magnet bars which are of the same width or thickness as the poles so that the body casting has front and back face portions overlying the poles and magnet bars. The entire magnet assembly with the exception of the pole faces 23 is thus completely embedded in the body casting.

The curvature of the magnet bars 20 hereinbefore referred to is such that their inner and outer surfaces, radially of the body, are substantially concentric to the axis of the body so that as the rotor revolves the spacing between the magnet bars and the stationary poles remains substantially constant.

For convenience in fixing the rotor to the shaft upon upon which it is to be mounted the body casting has a keyway 25 opening to and extending longitudinally of the bore 19, and one end of the body may be provided with an integral hub 26 through which a set screw (not shown) may be threaded for engagement with the shaft.

Figure 4:
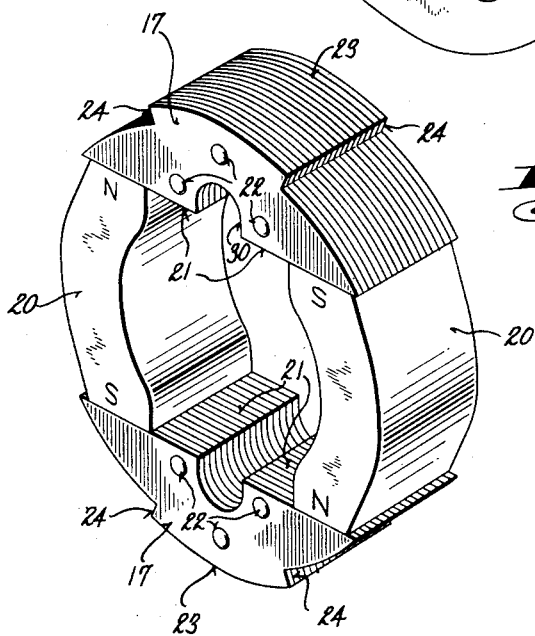
Figure 4 is a perspective view of the magnet assembly prior to being embedded in the body of the rotor.

In the making of the rotor, the Alnico magnet bars 20 are first magnetized and then assembled with the laminated poles 17 as shown in Figure 4. This assembly, held together by the magnetic attraction of the magnetized bars 20, is then placed in an annular mold cavity 27 with the pole faces 23 directly contiguous to the cylindrical side wall of the cavity. A central boss 28 which extends up from the bottom of the cavity and out of the mouth thereof provides a core to form the bore 19, and suitable locating pins extend into the cavity to properly locate and hold the magnet assembly against shifting during the casting of the rotor body. Two of these locating pins 29 engage in notches 30 in the pole pieces 17, and four other pins 31 are positioned to engage the assembly in the corner where the pole pieces join the magnet bars, while another pair of retractable pins 32 engage the outer sides of the magnet bars.

To support the magnet assembly off the bottom of the mold cavity a pair of pads 33 on the bottom of the cavity coact with segments 34 on the pins 31, and to hold the assembly in the cavity pads 35 project from the cover plate 36 which covers the mouth of the cavity when the die is closed. Obviously, after the die is closed the molten metal is injected into the cavity in the customary manner and upon opening of the die, ejector pins, which may be the corner pins 31, eject the casting from the mold.

Upon removal of the casting from the mold, its magnet bars are de-energized and such machining as is necessary is done. This includes turning down the diameter of the rotor and sizing the bore 19.

The magnet assembly is then remagnetized to give the two poles 17 opposite magnetic polarity.

From the foregoing description taken in connection with the accompanying drawings it will be readily apparent to those skilled in the art that this invention provides a rugged highly efficient mageto rotor and an expedient, inexpensive method of making the same.

What is claimed as the invention is:

1. A bi-pole magneto rotor, comprising: an annular body casting of non-magnetic material; a pair of opposite magnetic poles of identical shape embedded in the body at diametrically opposite portions thereof, with all except relatively short arcuate center portions flush with the periphery of the body embedded in the body casting, said central portions of the poles having the same curvature as the periphery of the body and being flush therewith; and a pair of spaced apart permanent magnet elements completely embedded in diametrically opposite rim portions of the body between said poles and each in engagement with both of said poles, said permanent magnet elements being covered by the casting.

2. The rotor set forth in claim 1 wherein each of said magnetic poles comprises a bank of thin laminae; and further characterized by the provision of fastening means independent of the body casting for holding the laminae of each bank thereof in tightly assembled relationship.

3. A bi-pole magneto rotor, comprising: a hub-like body of non-magnetic material; and a permanent magnet system embedded in said body, said magnet system including a pair of spaced apart permanent magnet bars disposed chord-like entirely inside diametrically opposite rim portions of the body but with the ends of each terminating short of the periphery of the body; and a pair of pole pieces embedded in the remaining opposite rim portions of the hub-like body, each of said pole pieces having embedded portions magnetically bridging the ends of the bars at one of said remaining rim portions, and each having an intermediate portion projecting radially beyond said embedded portions and terminating in a curved surface exposed at and flush with the periphery of the body.

4. The method of making a magneto rotor having a pair of diametrically opposite pole pieces connected by a pair of magnet bars, which comprises: assembling the magnet bars and pole pieces with their sides spaced apart and with the poles of the magnet bars engaging the pole pieces in such polar relationship that the magnetic attraction of the magnet bars holds the assembly together; placing the assembly in a mold cavity; casting non-magnetic material in the mold cavity and around the magnet assembly; removing the casting from the mold cavity; de-magnetizing the magnet bars; and magnetizing the magnet assembly to give its pole pieces opposite magnetic polarity.

5. A bi-pole magneto rotor, comprising: a hub-like body of non-magnetic material; and a permanent magnet system embedded in said body, said magnet system including a pair of spaced apart permanent magnet bars disposed chord-like entirely inside diametrically opposite rim portions of the body but with the ends of each terminating short of the periphery of the body; and a pair of pole pieces embedded in the remaining opposite rim portions of the hub-like body, each of said pole pieces having a radial portion intermediate the ends of the bars at one of said remaining rim portions and extending out to the periphery of the body to terminate in a curved surface flush therewith, and each of the pole pieces having circumferential extensions projecting from said intermediate radial portion and overlying the ends of the magnetic bars, in contact therewith, to magnetically bridge the ends of the bars, said extensions lying a distance inwardly of the periphery of the body so that the pole pieces are firmly embedded in the nonmagnetic material comprising the body.

6. A magnet assembly for the rotor of a bi-pole magneto, said magnet assembly comprising: a pair of opposite substantially identical pole pieces of magnetically permeable metal each having a mid-portion provided with an outer relatively short arcuate surface and shoulders flanking said mid-portion and projecting circumferentially therefrom at reduced radii, said pole pieces having opposing substantially flat parallel inner surfaces thereon; and a pair of substantially identical magnet bars interposed lengthwise between said pole pieces and having square ends flatwise engaging said flat opposing surfaces on the pole pieces near the circumferential ends thereof, and each pole piece having the unlike polar ends of the magnet bars engaged therewith, whereby the pole pieces cooperate with the magnet bars to define a completely closed magnetic circuit leading alternately lengthwise through the pole pieces and the bars, and the magnet bars magnetically hold the pole pieces on their ends in diametrically opposite relation to one another, said magnet bars having a length such as to hold the pole pieces spaced apart a distance to dispose their arcuate outer surfaces concentric to a common axis.

References Cited in the file of this patent
UNITED STATES PATENTS

| Number | Name | Date |
|---|---|---|
| 974,024 | Carter | Oct. 25, 1910 |
| 2,057,241 | Martin et al. | Oct. 13, 1936 |
| 2,077,255 | Nowosielski | Apr. 13, 1937 |
| 2,163,496 | Plotz | June 20, 1939 |
| 2,418,980 | Morrill | Apr. 15, 1947 |
| 2,493,102 | Brainard | Jan. 3, 1950 |